US008135850B2

(12) United States Patent
Narayana et al.

(10) Patent No.: US 8,135,850 B2
(45) Date of Patent: Mar. 13, 2012

(54) SYSTEMS AND METHODS FOR LOAD BALANCING REAL TIME STREAMING

(75) Inventors: Raghav Somanahalli Narayana, Bangalore Karnataka (IN); Sergey Verzunov, Moscow (RU)

(73) Assignee: Citrix Systems, Inc., Fort Lauderdale, FL (US)

( * ) Notice: Subject to any disclaimer, the term of this patent is extended or adjusted under 35 U.S.C. 154(b) by 300 days.

(21) Appl. No.: 12/323,243

(22) Filed: Nov. 25, 2008

(65) Prior Publication Data
US 2010/0131659 A1 May 27, 2010

(51) Int. Cl.
*G06F 15/16* (2006.01)
(52) U.S. Cl. ......... 709/228; 709/203; 709/223; 370/338
(58) Field of Classification Search .................. 709/228, 709/203, 208; 370/338
See application file for complete search history.

(56) References Cited

U.S. PATENT DOCUMENTS

| 7,003,574 | B1 | 2/2006 | Bahl | |
| 7,119,828 | B1* | 10/2006 | Kizhnerman et al. | 348/14.08 |
| 7,743,144 | B1* | 6/2010 | Wright et al. | 709/225 |
| 2003/0039237 | A1* | 2/2003 | Forslow | 370/352 |
| 2004/0177142 | A1* | 9/2004 | Pepper | 709/224 |
| 2005/0086297 | A1* | 4/2005 | Hinks | 709/203 |
| 2006/0056409 | A1* | 3/2006 | Piche et al. | 370/389 |
| 2006/0083208 | A1* | 4/2006 | Lin | 370/338 |
| 2007/0294423 | A1* | 12/2007 | Brockenbrough et al. | 709/231 |
| 2008/0144615 | A1* | 6/2008 | Casey | 370/389 |
| 2008/0270618 | A1* | 10/2008 | Rosenberg | 709/228 |
| 2010/0114889 | A1* | 5/2010 | Rabii et al. | 707/737 |
| 2010/0262650 | A1* | 10/2010 | Chauhan et al. | 709/203 |

FOREIGN PATENT DOCUMENTS
WO WO-2008/112699 9/2008

OTHER PUBLICATIONS

International Preliminary Report on Patentability in connection with PCT/US2009/065743 mailed Jun. 16, 2010.
International Search Report in connection with PCT/US2009/065743 mailed Jun. 16, 2010.
Written Opinion of the International Searching Authority in connection with PCT/US2009/065743 mailed Jun. 16, 2010.
Yeom H. Y. et al:"IP Multiplexing by Transparent Port-Address Translator" Proceedings of the Systems Administration Conference. Sep. 29, 1996, pp. 113-121, XP000826921.

* cited by examiner

*Primary Examiner* — Wing Chan
*Assistant Examiner* — Tesfay Yohannes
(74) *Attorney, Agent, or Firm* — Foley & Lardner LLP; Christopher J. McKenna

(57) ABSTRACT

The present application relates to systems and methods for managing of Real Time Stream Protocol (RTSP) sessions by an intermediary located between a client and a server. An intermediary located between a client and a server receives a response from the server to a request of the client to setup a media stream. The response may include a first session identifier established by the server. The intermediary may encode a port of the server and an internet protocol address of the server into the first session identifier to form a second session identifier. The intermediary may modify the response to identify the second session identifier as the session identifier provided by the server. The intermediary may transmit the modified response to the client responsive to the request of the client to setup the media stream.

18 Claims, 12 Drawing Sheets

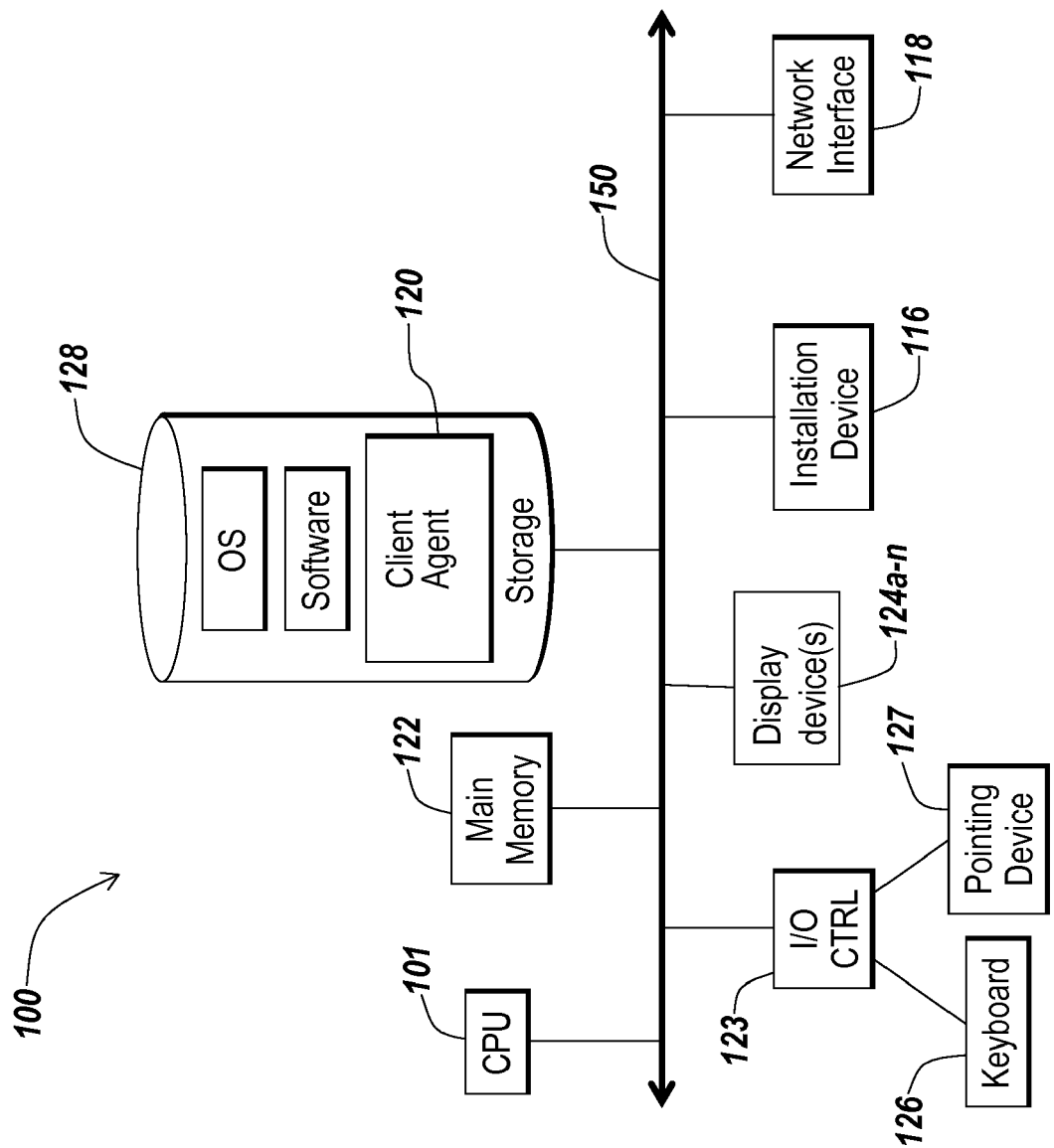

SYSTEMS AND METHODS FOR LOAD BALANCING REAL TIME STREAMING

FIELD OF THE INVENTION

The present application generally relates to data communication networks. In particular, the present application relates to systems and methods for management and load balancing of media streaming sessions.

BACKGROUND OF THE INVENTION

The Internet and World-wide-web are becoming ubiquitous infrastructure for distributing all kinds of data and services, including continuous streaming data such as video and audio. Streaming media delivery is gaining popularity as indicated by dramatically increased deployment of commercial products for playback of stored video and audio over the Internet, and proliferation of server sites that support audio/video content. Each media stream may consume significant server resources. Furthermore, a plurality of media streams may consume large amounts of server resources. Any one of the media streams may be streamed from any server of a plurality of servers to any wide range of clients at various locations. This proliferation of media content across an enterprise or network makes it challenging to manage or control the use of resources via the streaming media.

BRIEF SUMMARY OF THE INVENTION

The present disclosure offers improvements to management and load balancing of both media streaming sessions and media control sessions. As a media streaming channel is used to send streaming data to the client, the intermediary uses techniques described herein to manage and balance a media control session that may control streaming media data and/or the Furthermore, an appliance intercepting and forwarding the transmissions between the client and the server may utilize these improvements to provide load balancing of the media streaming sessions.

In some aspects, the present application relates to a method for managing Real Time Stream Protocol (RTSP) session by an intermediary between a client and a server. An intermediary located between a client and a server receives a response from the server to a request of the client to setup a media stream. The response may include a first session identifier established by the server. The intermediary may encode a port of the server and an internet protocol address of the server into the first session identifier to form a second session identifier. The intermediary may modify the response to identify the second session identifier as the session identifier provided by the server. The intermediary may transmit the modified response to the client responsive to the request of the client to setup the media stream.

In some embodiments, the intermediary may identify via the response the port and the internet protocol address of the server. In other embodiments, the intermediary may prefix a concatenation of the internet protocol address and the port of the server to the first session identifier. In further embodiments, the intermediary may append a concatenation of the port and the internet protocol address of the server to the first session identifier. In yet further embodiments, the intermediary may replace in the response the first session identifier with the second session identifier. In some embodiments, the intermediary may receive a second request from the client to control the media stream, the second request identifying the second session identifier.

In some embodiments, the intermediary decodes the port and the internet protocol address from the second session identifier. In further embodiments, the intermediary decodes the first session identifier of the server from the second session identifier of the second request. In yet further embodiments, the intermediary modifies the second request to use the first session identifier and forwarding the modified second request to the port and the internet protocol address of the server identified via the first session identifier. In some embodiments, the intermediary receives a second request from the client to control the media stream. The intermediary may determine that a session identifier of the second request does not comprise identification of the port and the internet protocol address of the server, and in response to the determination the intermediary may transmit a second response to the client. In some embodiments, the second response indicates that the session identifier is not valid or not found. In further embodiments, the second response indicates that a service requested by the second request is unavailable.

In some aspects, the present application relates to a method for managing by an intermediary between a client and a server a data session for streaming media controlled by a Real Time Streaming Protocol (RTSP) session. The intermediary between a client and a server may identify from a request of the client to setup a media stream and the corresponding response from the server via a control connection of an Real Time Streaming Protocol (RTSP) session, a first port of the client and a second port of the server over which the media stream is to be transmitted. The intermediary may establish a first listening service for communications from the server to the first port and a first internet protocol address of the client. The intermediary may establish a second listening service for communications from the client on the second port with a second internet protocol address of the intermediary. The second listening service of the intermediary may receive a transmission of the media stream via a real time transport protocol from the server to the client. The intermediary may forward the transmission of the media stream to the client upon modifying the transmission to identify the second internet protocol address of the intermediary.

In some embodiments, the intermediary may determine from monitoring communications via the real time transport protocol that the first port of the client has changed. The intermediary may in response to the determination, establishing a third listening service for communication from the server to the changed first port and the first internet protocol address of the client. In some embodiments, the intermediary may determine from monitoring communications via the real time transport protocol that the second portion of the server has changed. The intermediary may in response to the determination, establishing a third listening service for communication from the client to the changed second port and the second internet protocol address of the intermediary. In some embodiments, the intermediary may receive a first data packet of the transmission and responsive to the receipt of the first data packet disestablishing the second listening service. The intermediary may determine that the second port of the server had a previously established listening service, and in response to the determination, the intermediary may modify the second port of the server in the response to a third port, and forward the modified response to the client. In some embodiments, the intermediary establishes the second listening service using the third port. In further embodiments, the intermediary determines that one or more ports of the intermediary are free and modifies the response from the server to identify a port of the one or more free ports, and establishes by the intermediary a listening service on the port. In some embodiments, the intermediary monitors a last activity on the control connection between the client and the server and the transmission of the media stream between the client and the server. The intermediary determines that a time since the last activity has exceeded a timeout threshold and disestablishes one of the first listening service or the second listening service. In some embodiments, the intermediary identifies in the transmission of the media stream via the real time transport protocol information on internet protocol addresses and ports. In further embodiments, the intermediary performs network address translation on the internet protocol addressed and the ports.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 1E and 1F are block diagrams of embodiments of a computing device;

Figure 1A:
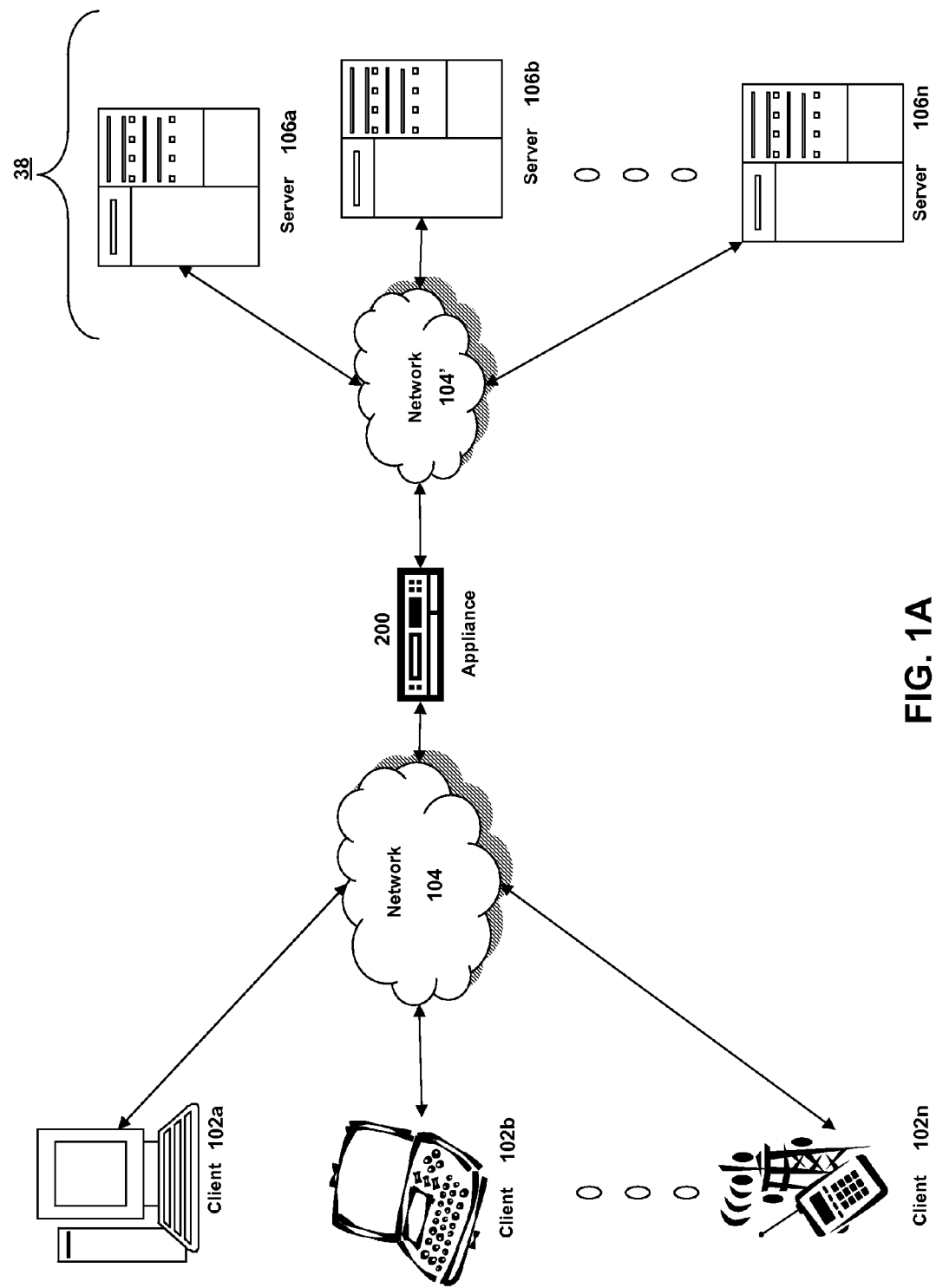
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server;

Section D describes embodiments of systems and methods for load balancing of Real Time Streaming Protocol (RTSP) sessions; and A. Network and Computing Environment Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
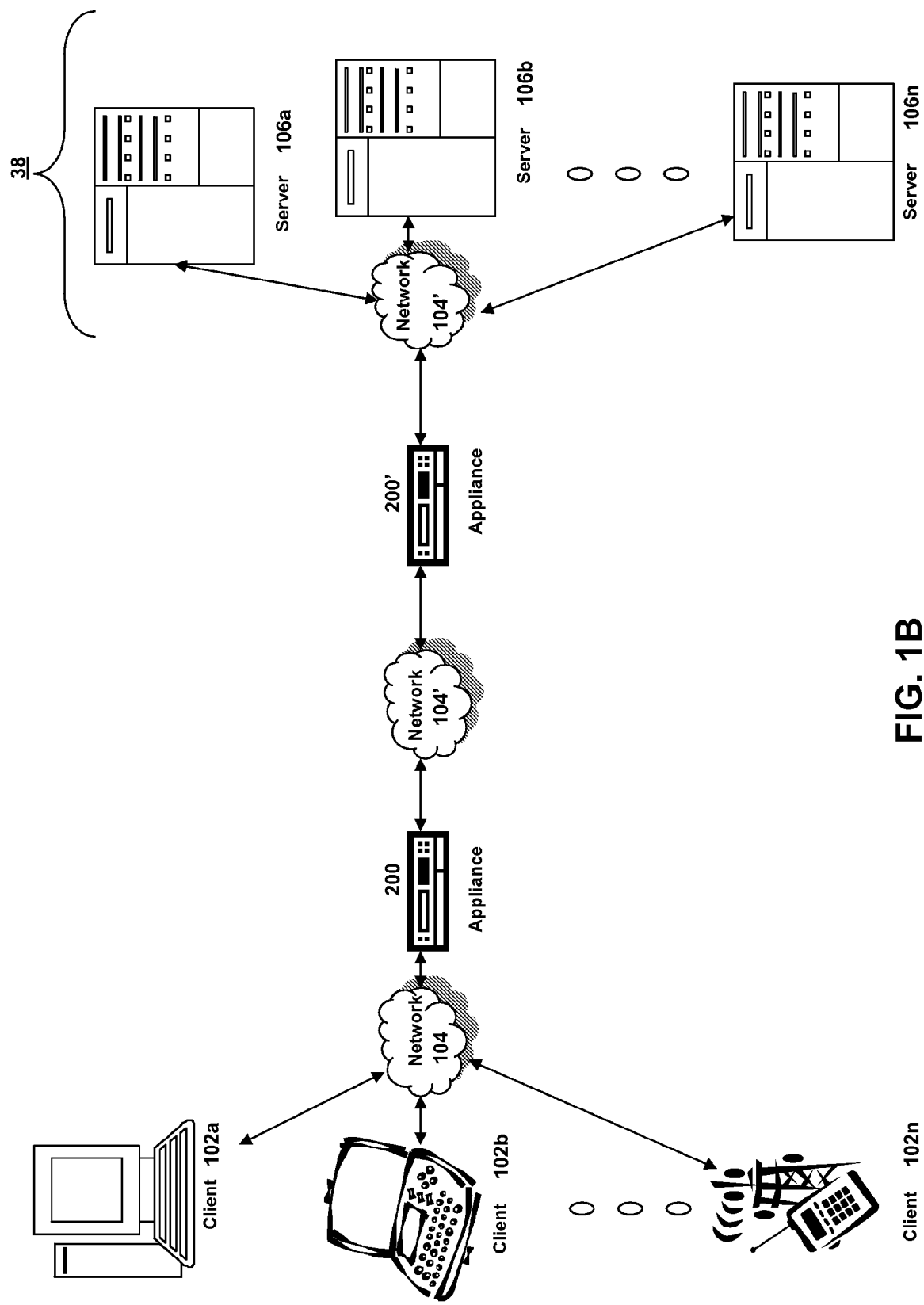
FIG. 1B is a block diagram of an embodiment of an environment for delivering a computing environment from a server to a client via an appliance.
Figure 1C:
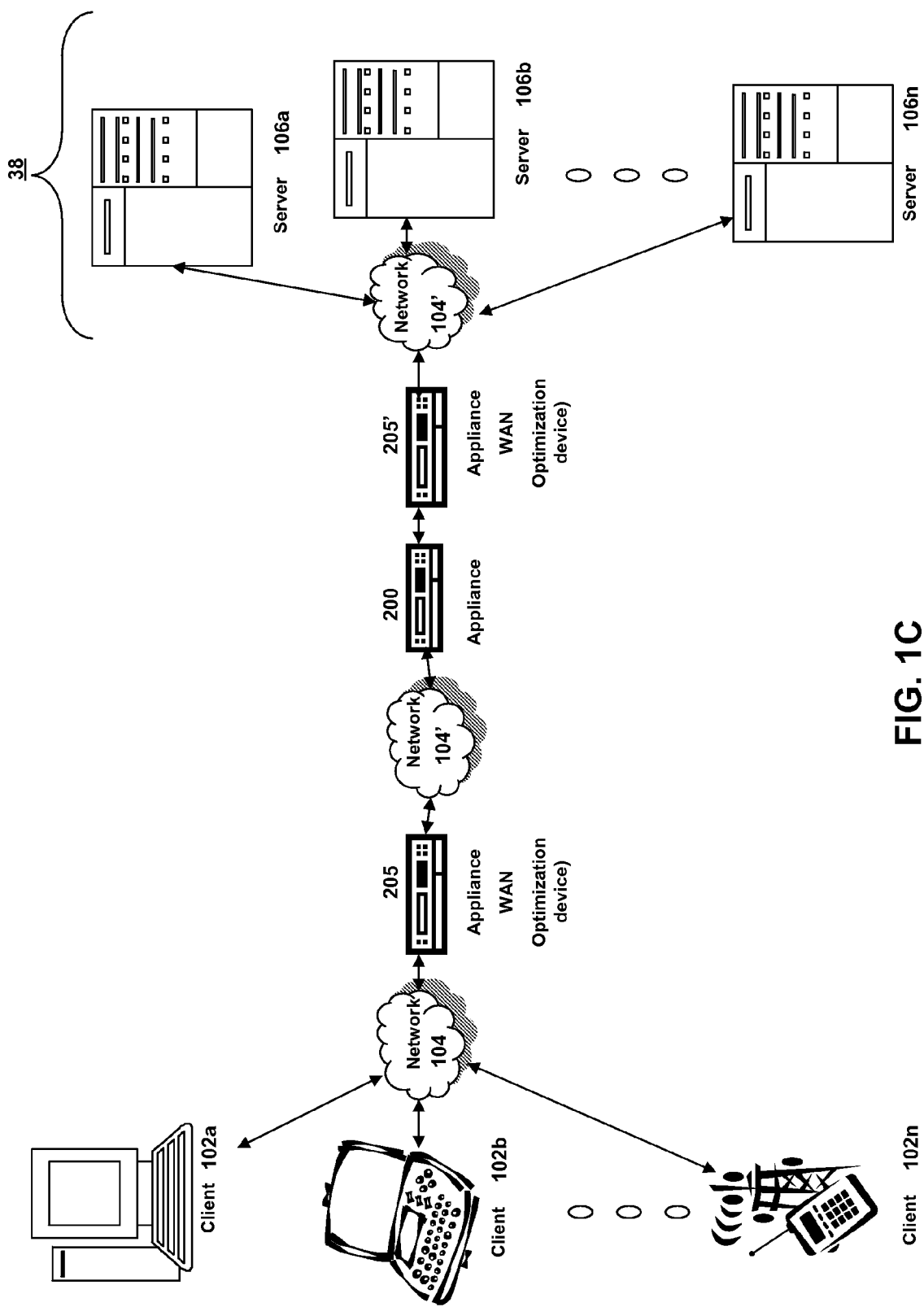
FIG. 1C is a block diagram of an embodiment of an environment for delivering a computing environment from a server to a client via a network.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WAN-Jet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
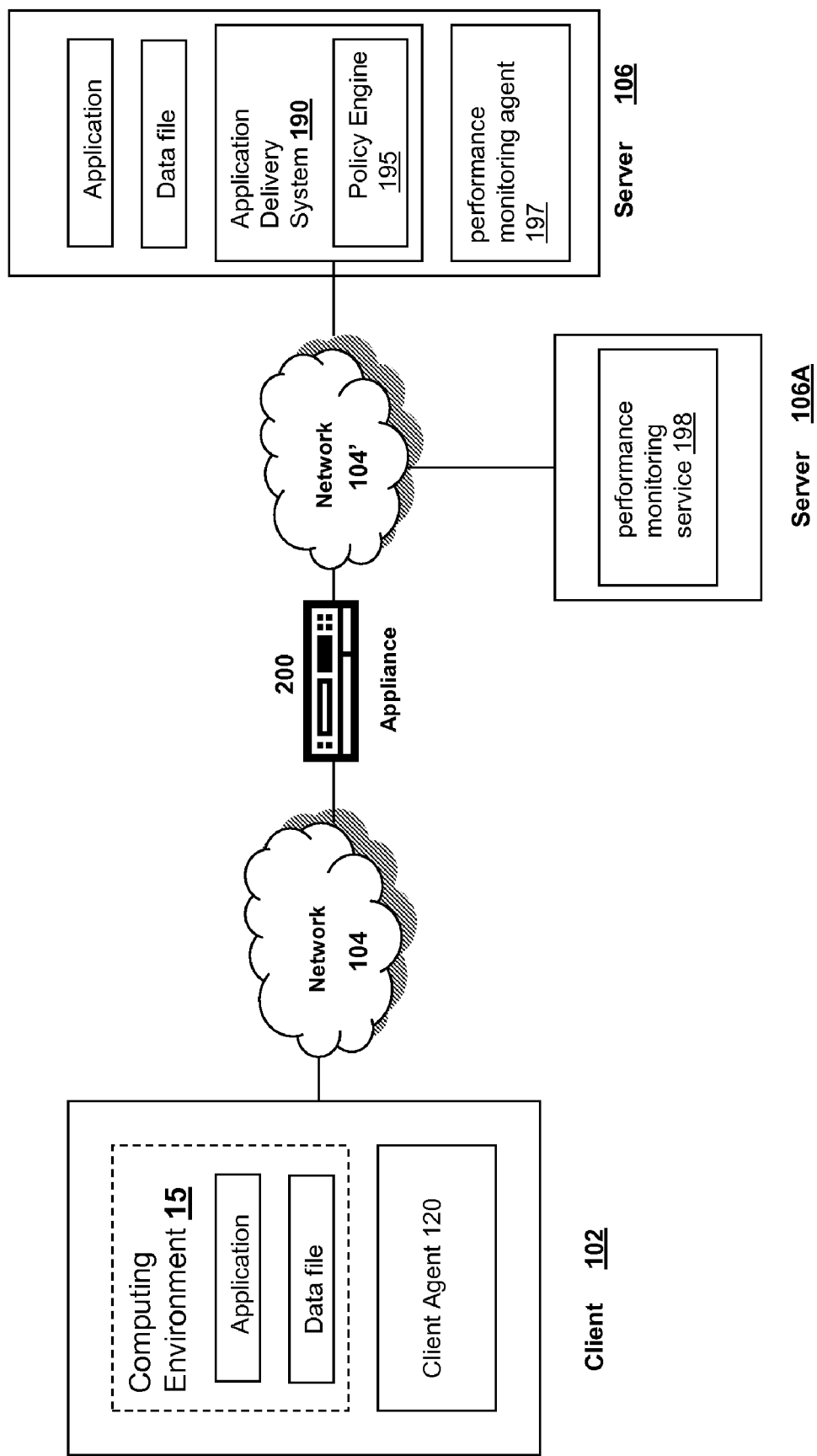
FIG. 1D is a block diagram of another embodiment of an environment for delivering a computing environment from a server to a client via a network.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file.

In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1F:
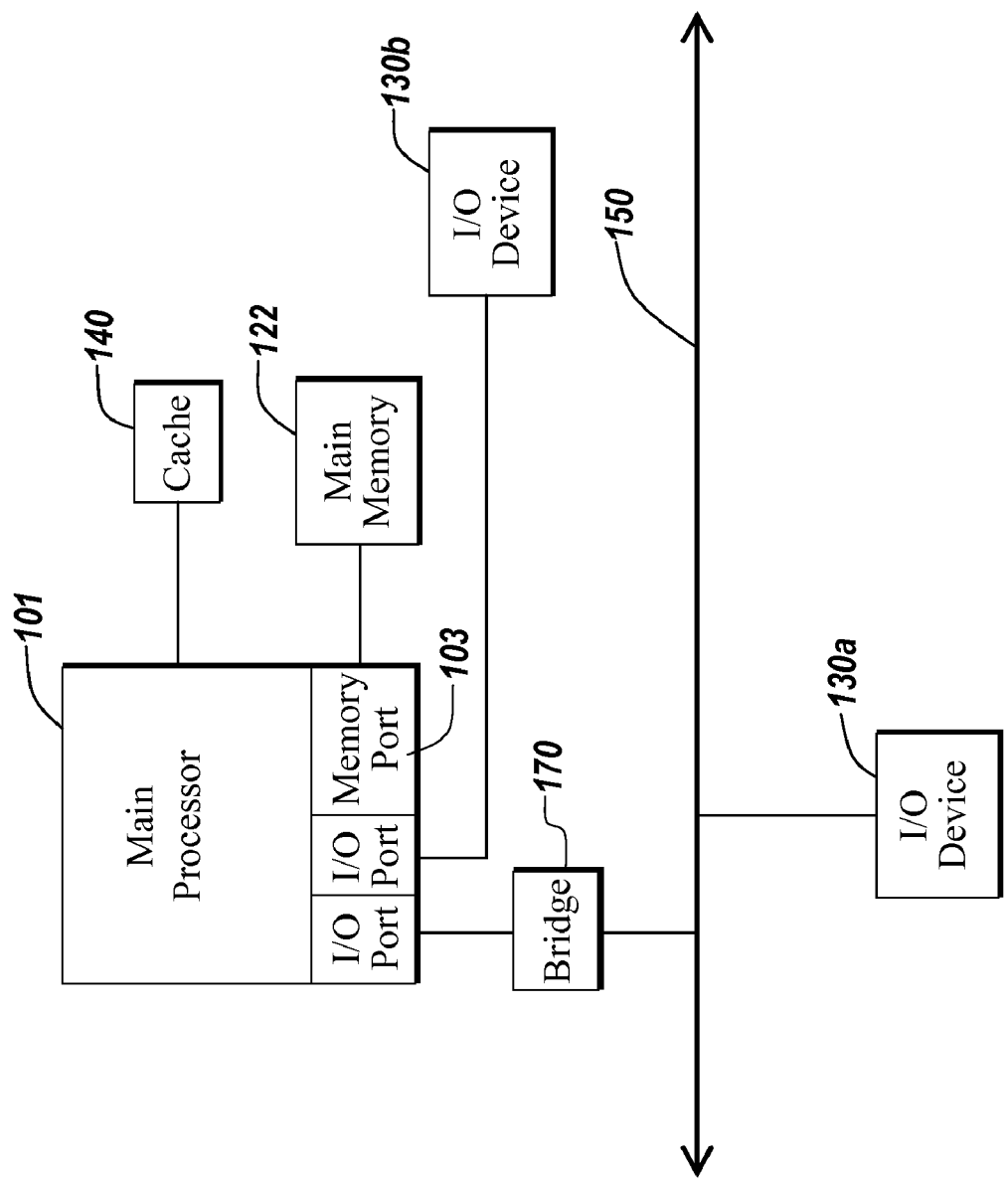

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g. ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
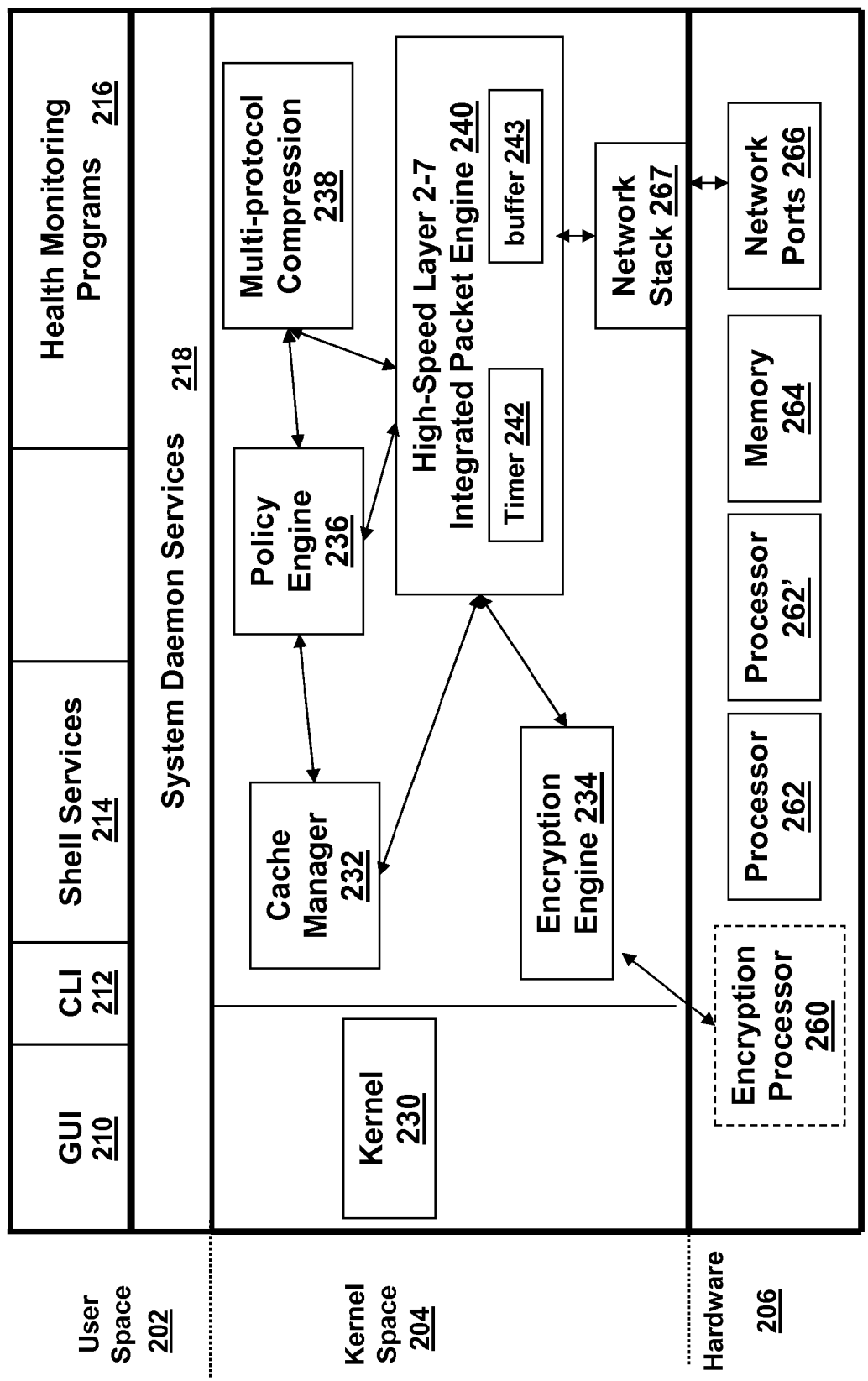
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of UNIX operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element that comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

Figure 2B:
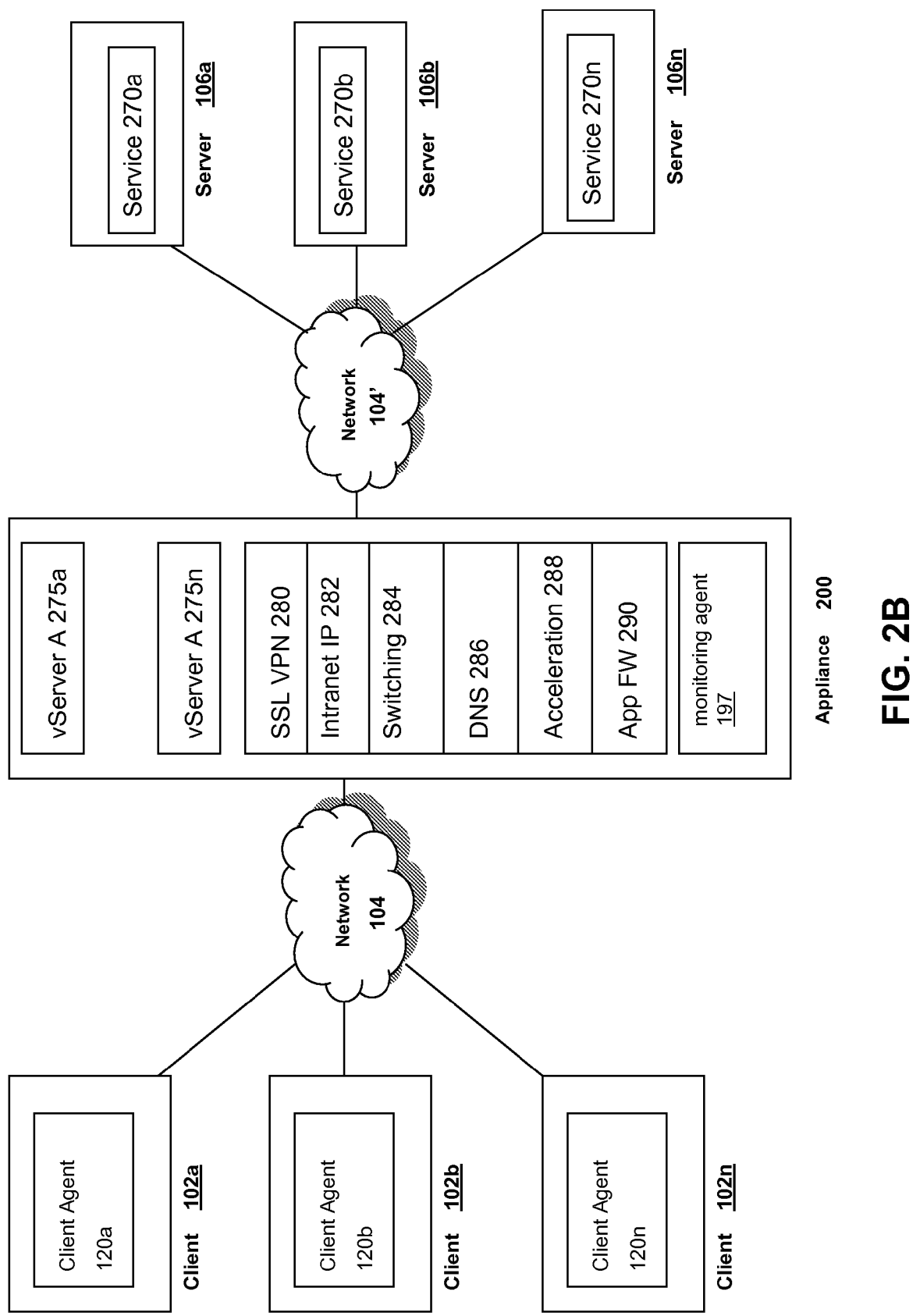
FIG. 2B is a block diagram of another embodiment of an appliance for optimizing, accelerating, load-balancing and routing communications between a client and a server.

In some embodiments, the policy engine 236 may provide a configuration mechanism to allow a user to identify, specify, define or configure policies directing behavior of any other components or functionality of an appliance, including without limitation the components described in FIG. 2B such as vServers 275, VPN functions 280, Intranet IP functions 282, switching functions 284, DNS functions 286, acceleration functions 288, application firewall functions 290, and monitoring agents 197. In other embodiments, the policy engine 236 may check, evaluate, implement, or otherwise act in response to any configured policies, and may also direct the operation of one or more appliance functions in response to a policy.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
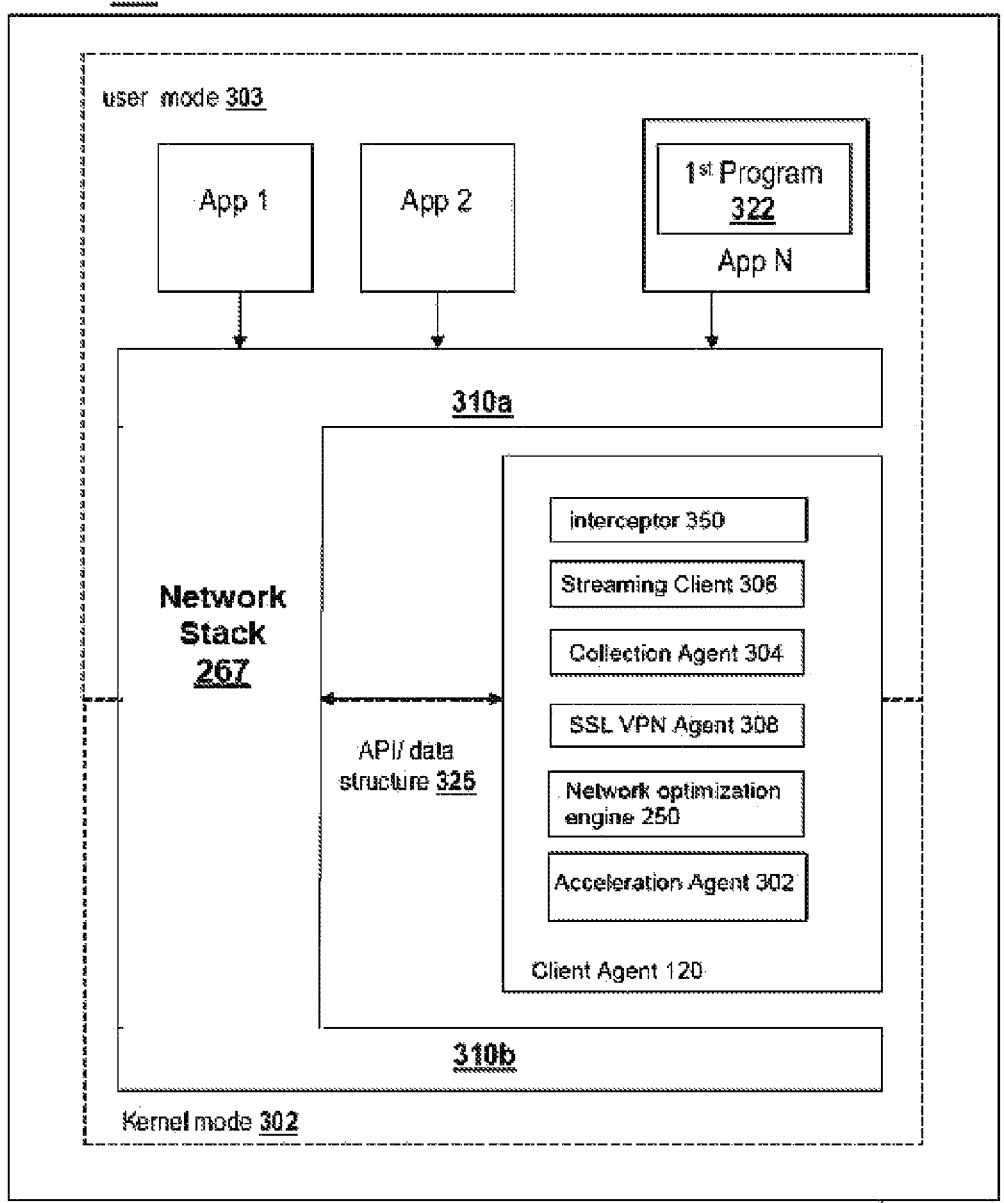
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archives In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Load Balancing of Real Time Streaming Protocol (RTSP) Sessions

Figure 4:
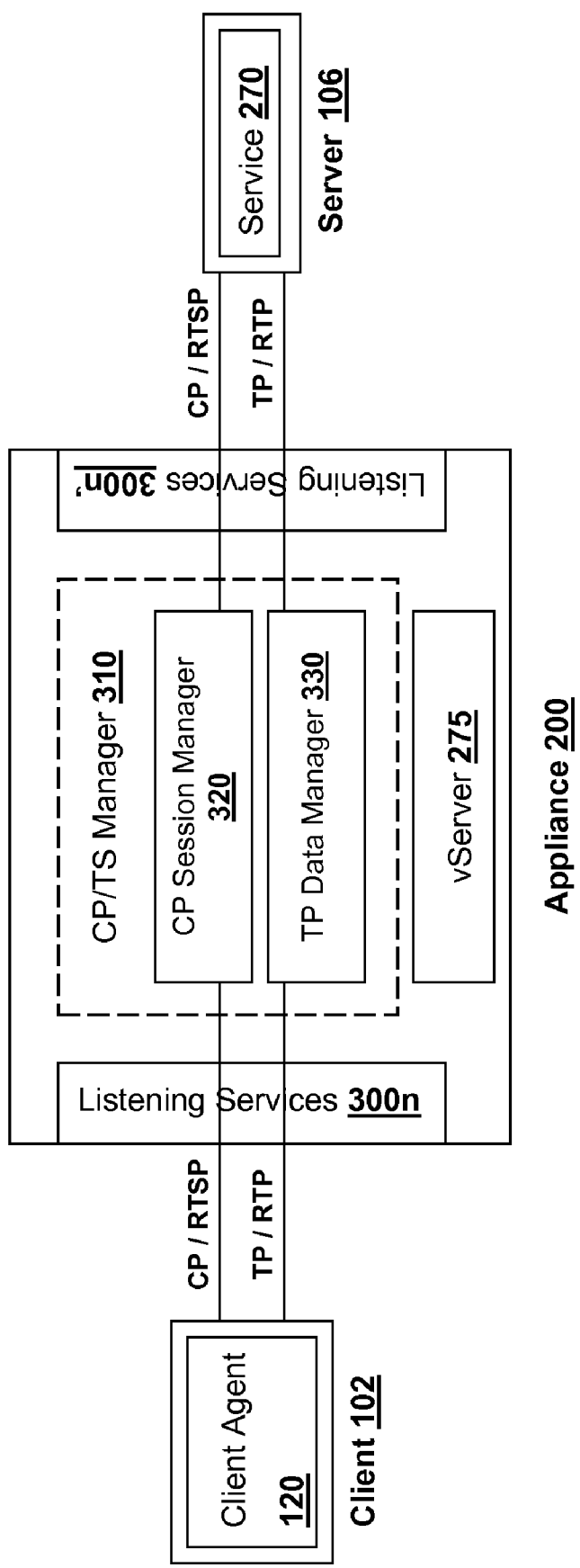
FIG. 4 is a block diagram of an embodiment of a network environment for management and load balancing of Real Time Streaming Protocol (RTSP) sessions via the appliance.

Referring now to FIG. 4, an embodiment of a system for management and load balancing of sessions established via a controlling protocol (CP) and a transporting protocol (TP) by an intermediary is depicted. In brief overview, a client 102 and a server 106 may communicate via appliance 200 using two sessions via CP and TP. Appliance 200 comprises listening services 300*n* on the client side 102 and listening services 300*n*' on the server 106 side. Listening services 300 listen and receive transmissions transmitted by the client 102 and server 106. Appliance 200 further comprises CP/TP manager 310 that controls and manages control communications and data transmitted between the client 102 and server 106 via CP and TP protocols. CP/TP manager 310 includes CP session manager 320 that establishes and manages CP sessions and TP data manager 330 that establishes and manages TP sessions. Appliance 200 also includes vServer 275 for load balancing of the information transmitted via CP and TP sessions across the servers 106.

In further view of FIG. 4, a controlling protocol (CP) may be any type and form of a protocol or a communication scheme for controlling and managing by a client 102 one or more resources stored on a server 106. CP protocol may include any software, hardware or a combination of software and hardware for controlling, using and managing media files, such as audio or video files, presentation files or graphics. CP may also be any communication scheme or a protocol for a client 102 to control, use or manage a server 106 storing or providing access to media or presentation resources or services. In some embodiments, CP is a Real Time Streaming Protocol (RTSP). In some other embodiments, CP is Transmission Control Protocol (TCP). In other embodiments, CP is User Datagram Protocol (UDP). In still other embodiments, CP is Internet Protocol Control Protocol (IPCP). In yet other embodiments, CP is Datagram Congestion Control Protocol (DCCP). In yet other embodiments, CP is Media Gateway Control Protocol (MGCP). In still other embodiments, CP is Network Control Protocol (NCP). In some embodiments, CP is Stream Transmission Control Protocol (STCP).

CP may comprise commands, instructions or functionality the client and/or server uses to remotely access, use, control or manage any media stream of a group of streams corresponding to media resources or services provided by the server 106. The group of streams provided by the server 106 may correspond to an online presentation that includes media files of slides, pictures, audio or video files. Each of the files of the online presentation may be streamed to the client via a separate stream. CP may include commands or instructions available to the client 102 to manage, use and control any stream transmitted from the server 106. In some embodiments, the client 102 controls or manages only one of the group of streams streamed from the server 106 to the client 102. Sometimes, the commands or instructions transmitted via CP may be VCR-like commands and instructions, such as play, stop, pause, fast forward, rewind and record. The commands and instructions may further include commands or instructions for the server to return a description of the protocol used for transmitting streaming data to the client 102. The commands and instructions may order the client to register a description of a file or group of files being streamed over to the client 102. The commands and instructions transmitted via CP may further include setup or control options to allocate or control resources for the stream, instructions to start or stop the stream or instructions to manipulate operating modes of the streams. In some embodiments, the user on client 102 uses, controls and manages one or more streams of data transmitted over a protocol that is different from the CP via the controlling protocol CP. The client 102 may control any number of transmissions or streams via any number of protocols by sending controls or instructions via CP.

Via the CP, a server and client may establish a session for controlling a media session. The session may be identified by a session identifier which may be established or generated by the server. Via the CP, each of the server and/or the client may establish an IP address and/or port for transmitting and/or receiving one or more media streams. Via the CP, the server and/or client may request, exchange or provide any parameters, values, requirements or options regarding the streaming of the media. In some embodiments, the client and/or server communicate type and form of media content, type and from of media servers and players and any versions thereof.

Transport Protocol (TP) may be any type and form of protocol or a communication scheme for a server 106 to transmit data or information, such as server resources or services to a client 102. TP may be any protocol or communication scheme for transmitting blocks of data, packets of data or streams of data between network devices. In some embodiments, TP is a protocol for a server 106 to transmit to a client 102 data. TP may be used to transmit data such as streaming data of a media file or a data of a picture, a graphical file or an audio file. TP may be a protocol used by the server 106 to transmit to a client 102 a plurality of data streams. In some embodiments, TP is Real-time Transport Protocol (RTP). In other embodiments, TP is Secure Real-time Transport Protocol (SRTP). In yet other embodiments, TP is an internet protocol (IP). In yet further embodiments, TP is Real Data Transport (RDT) protocol. In still further embodiments, TP is Transmission Control Protocol (TCP). TP may include any type and form of functionality to implement or respond to instructions or controls received via another protocol, such as the CP protocol. In some embodiments, a server 106 transmits data to a client 102 via TP while the client 102 controls, uses or manages the transmissions of the TP via CP.

For example, an appliance 200 may use CP and TP to implement and control a transmission and streaming of a presentation that includes media files, such as audio, video and slide files stored on the server 106. A client 102 receives from the server 106 one or more streams of data corresponding to the media files of the presentation. The client 102 may transmit via CP to the server 106 instructions or controls to change the operation or change the operating mode of one of the streams. The server 106 may in response to the instructions or controls, implement the instruction which may stop or start playing of one of the media files, such as an audio file for example. Other instructions may result in fast forwarding of a video file or jump to a different slide of a presentation. Instructions transmitted via CP may thus affect the data being streamed via TP sessions. The client 102 may then send additional instructions via CP and resume the playing of the audio or video file being streamed from the server 106 to the client 102.

Still referring to FIG. 4, listening service 300 may be any software, hardware, or a combination of software and hardware for listening for and receiving information transmitted to a port and IP address, such as port and IP address of the appliance 200. Listening service 300 may be a software program, a module or a unit operating on the appliance 200. In some embodiments, listening service 300 is any type and form of an executable file or a program, a script or an application, or any piece of software operating individually or in a conjunction with another software or hardware. Listening service 300 may be established to receive transmissions from a specific source on a network, such as a particular client 102, server 106 or a particular port at a particular client 102 or a server 106. In some embodiments, listening service 300 is established to listen for and receive communication from a specific client 102 or a specific server 106. In view of a TCP stack, in some embodiments, a listening service uses a listen function or API to wait for a TCP connection request. In some embodiments, a listening service uses a listen function or API to wait for a communication via an established TCP connection.

Listening service 300 may be established or activated by any component of the appliance 200. In some embodiments, listening service 300 is established or activated by CP/TS manager 310. Sometimes, the listening service 300 may be established or activated in response to a request or a transmission from a particular client 102 or a server 106. In further embodiments, listening service 300 is established or activated in response to a response of the server 106 to the request by the client 102. The request from the client 102 may include client 102's internet protocol address and a port of the client 102 specified in the request or the response. Similarly, the response to the client's request from the server 106 may include server 106's internet protocol address and a port of the server 106 specified in the request or the response. In some embodiments, listening service 300 is established using any information relating the client 102 or the server 106.

The information of the client 102 or the server 106 may be extracted from the request and the response or any other transmission from the client 102 or server 106. The information relating the client 102 and server 106 may include one or more unique identifiers, each uniquely identifying the client 102 or the server 106. Listening service 300 may in addition to the client 102 and server 106 related information use any additional information to identify a transmission from the client 102 and server 106. Listening service 300 may use a policy or a rule to match an incoming request or an incoming response in order to match the request or the response with the server 106 or the client 102. Listening service 300 may also use a map comprising information relating the server 106 and the client 102 in order to match an incoming request from the client 102 or the server 106 to the client 102 or the server 106.

Listening service 300 may listen or wait for the transmission from the client 102 or server 106 by matching a port of the incoming transmission against the port specified by the request of the particular client 102 or the response of the particular server 106. Listening service 300 may be established or activated by a CP/TP manager 310, a CP session manager 320, a TP manager 330 or any other component of the appliance 200. In some embodiments, appliance 200 comprises a plurality of listening services 300a-300n, each listening service 300 listening to or receiving information from a unique client 102 or a unique server 106.

CP/TP manager 310 may be any type and form of hardware, software or a combination of software and hardware for establishing and controlling CP or TP sessions. CP/TP manager 310 may also be a unit, module or a component for establishing and controlling transmissions between a client 102 and a server 106 transmitted via CP and TP sessions. CP/TP manager 310 may be any type and form of an executable file or a program, a script, an application or any piece of software operating alone or in conjunction with another software or hardware. CP/TP manager 310 may be any device, module, unit or a component of an appliance 200 coordinating or managing information transmitted via a TP session with information transmitted via a CP session. In some embodiments, CP/TP manager 310 further coordinates information transmitted via a CP session with information transmitted via a TP session. In some embodiments, CP/TP manager 310 controls the flow or throttling of information transmitted via a TP session using the information transmitted via the CP session. In further embodiments, CP/TP manager 310 manages streaming of a data from a media file streamed via a TP session using the information transmitted via a CP session. In yet further embodiments, the data transmitted or streamed between a client 102 and a server 106 via a TP session and the information transmitted between the client 102 and the server 106 via a CP session traverses appliance 200. The data transmitted or streamed via the TP and CP sessions may further traverse CP/TP manager 310. In some embodiments, CP/TP manager 310 edits, modifies or controls the transmissions transmitted via CP or TP sessions as the transmissions are traversing the appliance 200. CP/TP manager 310 may edit the traversing transmission, add to the traversing transmission or subtract from the traversing transmission one or more components of the message transmitted via CP or TP protocols. CP/TP manager 310 may edit, modify or add to or subtract from the traversing transmission specific sections of the message such as the internet protocol address of the client 102 or the server 106 and specific port of the client 102 or the server 106. CP/TP manager 310 may edit or modify any portion of any transmission or message transmitted between the client 102 and server 106, via the CP/TP manager 310 of the appliance 200. CP/TP manager 310 may be establishing, controlling and managing a RTP session between a client 102 and a server 106 and via an appliance by using a message transmitted via RTSP session established between the client 102 and server 106, via the appliance 200.

In one example, a CP/TP manager 310 may receive a request from a client 102a to stream a media file stored on a server 106. CP/TP manager 310 may forward the client's 102 request to the server 106 and receive from the server 106 a response to the request of the client 102a. The response may comprise an internet protocol address and a communication port of the client 102a as well as an internet protocol address and a communication port of the server 106. CP/TP manager 310 may determine that there is no conflict between the internet protocol addresses or ports of the client 102a and server 106 with other ports of the previously established listening services 300. CP/TP manager 310 may proceed to establish or activate a listening service 300a of the client 102a to listen for any incoming information from the server 106 using the internet protocol address of the client 102a and the communication port of the client 102a. CP/TP manager 310 may further establish or activate a listening service 300b of the server 106 to listen for transmissions from the client 102a. Listening service 300b may use internet protocol address of the intermediary and a communication port of the client 102a to listen for the communication from the server 106. CP/TP manager 310 may utilize listening services 300a and 300b to receive the transmissions between the client 102 and server 106. Once a transmission is received from the server 106, CP/TP manager 310 may determine that incoming transmission includes a correct internet protocol address and a correct port and may forward the unchanged transmission to the client 102a.

In a further example, CP/TP manager 310 may receive a request from client 102b. Client 102b may request to use the same port of the server 106 that is already utilized by the client 102a. Upon receiving the response to the request from the server 106, CP/TP manager 310 may determine that the requested port has already been used. CP/TP manager 310 in response to the determination, may establish a listening service 300c for listening to the client's 102b communication using the internet protocol address of the appliance together the port of the server that client 102b requested in the request. Furthermore, CP/TP manager 310 may establish a listening service 300d to listen to information transmitted from server 106. The listening service 300d may use internet protocol address of the client 102b and the port of the client 102b. The client 102b may then transmit a message to the server 106 via a CP session. Listening service 300c listening for the communication from the client 102b may receive the message and forward the message to CP/TP manager 310. CP/TP manager 310 may determine that the internet protocol address in the message needs to be changed to the internet protocol address of the server. CP/TP manager 310 may also determine that the port of the server 106 from the received message needs to be changed to an available port of the appliance and/or server. CP/TP manager 310 may modify the message to comprise the new internet protocol address of the server 106 and the new available communication port of the server 106 and/or appliance. CP/TP manager 310 may transmit the modified message to the server 106. In this manner as well as in other examples, CP/TP manager 310 may control and manage transmissions between the client 102 and server 106 without the client 102 or server 106 being aware or affected by the appliance 200's presence.

Still referring to FIG. 4, a CP session manager 320 may be any hardware, software or a combination of hardware and software for establishing, controlling and managing CP sessions between one or more clients 102 and servers 106. A CP session manager 320 may be any type and form of an executable file or a program, a script, an application or any type of software or executable instructions operating alone or in conjunction with another software or hardware. In some embodiments, CP session manager 320 is a module or a unit of the CP/TP manager 310 establishing a CP session using information relating to a client 102 and server 106. In further embodiments, CP session manager 320 establishes a CP session using an information from a request by from client 102 to establish a CP session. In yet further embodiments, CP session manager 320 establishes a CP session using information from a response of the server 106 to the request of the client 102. CP session manager 320 may use any portion of the request from the client 102 or response from the server 106 to establish a CP session or a CP connection. CP session manager 320 may include any functionality and perform any function of the CP/TP Manager 310. In some embodiments, CP session manager 320 edits and modifies messages between the client 102 and server 106 to match internet protocol addresses or ports of the clients 102 or servers 106. In further embodiments, CP session manager 320 maintains a plurality of sessions between any number of clients 102 and any number of servers 106. In yet further embodiments, CP session manager 320 determines that an incoming message from a client 102 or a server 106 includes a port of the destination network device that is already used. CP session manager 320 may edit an incoming message to replace an already utilized port of a network device which is a destination to the request with an available port of the same network device. In some embodiments, CP session manager 320 edits the incoming massage 320 to include the correct internet protocol address of the network device that is a destination network device. CP session manager 320 may forward the edited message to the destination network device. CP session manager 320 may be establishing, controlling and managing a RTP session between a client 102 and a server 106 and via an appliance by using a message transmitted via RTSP session established between the client 102 and server 106, via the appliance 200.

TP data manager 330 is any software, hardware or a combination of hardware and software establishing, controlling and managing TP sessions between clients 102 and servers 106. TP data manager 330 may be any type and form of an executable file or a program, a script, an application or any type of software or executable instructions operating alone or in conjunction with another software or hardware. TP data manager 330 may control and manage the flow of data transmitted, streamed or transmission of media between the client 102 and server 106, via the appliance 200. The data streamed from the server 106 may be transmitted via an established TP session. TP data manager 330 may interrupt, modify, change or manage the stream transmitted via TP session in response to a control or an instruction received by the CP/TS manager 310 via a CP session. TP data manager 330 may be establishing, controlling and managing a RTP session between a client 102 and a server 106 and via an appliance by using a message transmitted via RTSP session established between the client 102 and server 106, via the appliance 200.

In some embodiments, TP data manager 330 establishes a TP session by using information relating to a client 102 and server 106. In further embodiments, TP data manager 330 establishes a TP session using an information from a request by a client 102 to establish a TP or a CP session. In yet further embodiments, TP data manager 330 establishes a TP session using information from a response of the server 106 to the request of the client 102. TP session manager 330 may use any portion of the request from the client 102 or response from the server 106 to establish a TP session or a TP connection. TP data manager 330 may include any functionality or perform any operation of the CP/TP Manager 310. TP data manager 330 may include any functionality or perform any operation of the CP session manager 320. TP data manager 330 may edit and modify messages between the client 102 and server 106 to match the correct internet protocol addresses or ports of the clients 102 and servers 106. In some embodiments, TP data manager 330 maintains a plurality of sessions between any number of clients 102 and any number of servers 106. In further embodiments, TP data manager 330 determines that an incoming message from a client 102 or a server 106 includes a port of the destination network device that is already used by the appliance. TP data manager 330 may edit the incoming message to replace the already used port of the destination appliance with an available port of the appliance. TP data manager 330 may forward the modified message to the destination network device.

The CP/TS manager, CP Session manager and TP Data manager may determine, manage and/or use any of the IP addresses and ports of the appliance in managing CP and/or TP sessions. If the appliance is already using an IP address and/or port identified in either a server or client communication via the establishment of the CP session, the appliance may determine an available port and/or IP address to modify the CP messages between the client and server. For example, in the exchange of SETUP request and responses via the RTSP protocol, the appliance may modify any of the server or client ports and/or IP addresses to available ports and/or IP addresses of the appliance.

Figure 5:
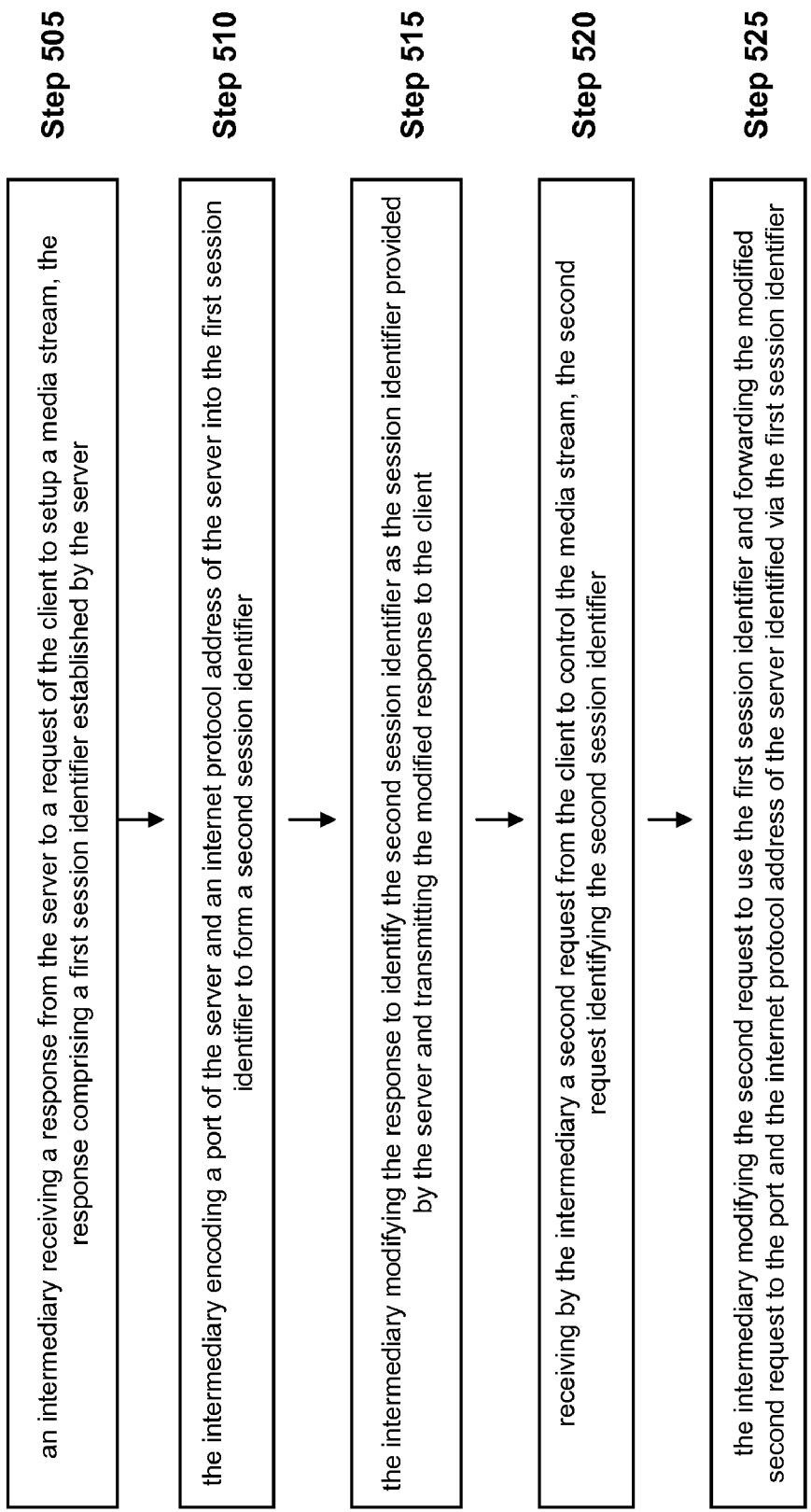
FIG. 5 is a flow diagram of an embodiment of steps of a method for management of RTSP sessions via the appliance.

Referring now to FIG. 5, a flow diagram of embodiments of steps of a method for managing or load balancing a Real Time Stream Protocol (RTSP) session by an intermediary is illustrated. In a brief overview, at step 505 an intermediary receives a response from the server to a request of the client to setup a media stream. At step 510, the intermediary encodes a port of the server and an internet protocol address of the server into the first session identifier to form a second session identifier. At step 515, the intermediary modifies the response to identify the second session identifier as the session identifier provided by the server and transmitting the modified response to the client. At step 520, the intermediary receives a second request from the client to control the media stream. At step 525, the intermediary modifies the second request to use the first session identifier and forwards the modified second request to the port and the internet protocol address of the server identified via the first session identifier.

In further detail, at step 505 an intermediary receives any type and form of response from one or more servers to one or more requests of one or more clients to setup any number of transmissions or streams. In some embodiments, an intermediary receives a response of the server 106 to a request of a client 106. The response may be any response of the server 106 responding to a request of the client 102 to establish one or more connections between the client 102 and server 106. The response of the server 106 may be to one or more requests of the client 102 to establish one or more sessions or channels of communication between the client 102 or server 106. In some embodiments, the response is to a request to establish one or more sessions to stream media between the client 102 and server 106. In further embodiments, the response is to a request to establish one or more sessions to control streaming of media transmitted or streamed via one or more other sessions. For example, the response may a response to SETUP request of the client via RTSP protocol.

The intermediary may receive a response from a server 106 or a plurality of responses from one or more servers 106. The responses or a single response may be in response to any number of requests from any number of clients 102. The response may comprise a first session identifier established by the server 106. The first session identifier may be any type and form of identifier uniquely identifying a session, such as a unique number, a unique set of characters, a unique signal or a unique marker of any type and form. Sometimes the first session identifier includes a plurality of unique numbers, unique characters or unique markers. In some embodiments, the first session identifier includes an internet protocol address of the server 106. The first session identifier may include an internet protocol address of the client 102. In some embodiments, the first session identifier includes a client 102 port identifier. The client 102 port identifier may uniquely identify a port of the client 102. In further embodiments, the first session identifier includes a server 106 port identifier, the server 106 port identifier uniquely identifying a port of the server 106.

At step 510, the intermediary 200 encodes an identifier of the server and/or server port into the first session identifier to form a second session identifier. In some embodiments, the intermediary encodes an internet protocol address of the server into the first session identifier. In further embodiments, the intermediary encodes a port of the server into the first session identifier. In yet further embodiments, the intermediary encodes an identifier uniquely identifying a port of the server 106 and the server 106 into the first session identifier. An identifier may be any code word, number or set of numbers and characters uniquely identifying any feature of a client 102, server 106 or a TP and CP session established between the client 102 and server 106. The identifier of the first session may include an internet protocol address or domain name of the client 102, server 106 and the appliance 200. Sometimes, the identifier may include a port of the client 102, server 106 and appliance 200. In some embodiments, the identifier uniquely identifies a CP or a TP session between the client 102 and server 106. In further embodiments, the identifier identifies a command or an instruction transmitted via CP or TP session. In yet further embodiments, the identifier identifies an application or a file transmitted between client 102 and server 106, such as the media stream file. Sometimes, the intermediary may modify the first session identifier without forming a second session identifier. The intermediary may use the modified first session identifier instead of the second session identifier. In some embodiments, the intermediary does not modify the first session identifier when encoding the first session identifier to form a second session identifier. The intermediary may utilize the first session identifier to create a second session identifier. The second session identifier may be a modified copy of a first session identifier modified to include an internet protocol address of the server 106 and a port of the internet protocol address of the server 106.

At step 515, the intermediary modifies the one or more responses to identify the second session identifier as the session identifier provided by the server. The intermediary may transmit the modified one or more responses to the client 102. Sometimes, the intermediary transmits the modified one or more responses to a plurality of clients 102. In some embodiments, the modified response from the server 106 comprises the second session identifier. In some embodiments, the intermediary edits or modifies the response from a plurality of servers to include the second session identifier. In other embodiments, the intermediary edits or modifies the response to include an information associated with the second session identifier. The intermediary may modify the response from the server 106 to replace a session identifier in the response with the second session identifier. The intermediary may transmit the modified response comprising the second session identifier to the server 106. In other embodiments, the intermediary edits or modifies the response to include a second session identifier in addition to a session identifier included in the response.

At step 520, the intermediary receives a second request from the client to control the transmissions or the streams. The second request may identify or include the second session identifier. Sometimes, the intermediary receives any number of second requests from the client. In some embodiments, the second request identifies the second session identifier by including an information associated with the second session identifier. The intermediary may receive the second request from any number of clients 102. The second request may include a command or an instruction to control one or more transmissions between the client 102 and server 106. In some embodiments, the second request includes a command or an instruction to control a data of a media streamed over a session or transmission different from the session or transmission the second request is received by. A command or an instruction may be any one or any group of VCR-like commands or instructions, such as a play command, a pause command, a fast forward command, a rewind command, or a record command. In some embodiments, a command or an instruction includes a describe command causing the server 106 to return a description of the protocol or protocols used. In other embodiments, a command or an instruction includes a setup command causing the server to allocate resources for a stream and start a CP or a TP session. In further embodiments, the setup command causes the server to start an RTSP session. In some embodiments, the command or instruction includes a record command causing the server 106 to start recording the stream or transmission being transmitted or streamed to the client 102. In other embodiments, the command or instruction includes a pause command halting the transmission of the stream without freeing any server resources. The client may transmit another request comprising the play command or the resume command causing the server to resume playing of the stream transmitted. In some embodiments, the intermediary receives a second request identifying or including a teardown command freeing resources on the server 106 and extinguishing or terminating the TP or CP session. In further embodiments, the teardown command terminates the RTSP session. In yet further embodiments, the command is get_parameter or set_parameter command manipulating or modifying one or more parameters of streaming files such as media files. The commands get_parameter or set_parameter may manipulate or modify one or more parameters of sessions such as TP and CP sessions. In yet further embodiments, the command or instruction is a redirect command that causes the client to access a server 106 different from the server 106 previously accessed by the client to stream data from or establish TP or CP sessions or connections with.

At step 525, the intermediary modifies the second request and forwards the modified second request to the server and the port of the servers identified by first session identifiers. The intermediary may modify the second request to use the first session identifier. The intermediary may forward the modified second request to the port and the internet protocol address of the server identified via the first session identifier. The intermediary may modify any number of second requests to include any information from any first session identifier. In some embodiments, a second request is modified to be identical or substantially similar to the first request. In other embodiments, the second request is modified to include an internet protocol address of the client or the server identified by the first request. In further embodiments, the second identifier is modified to include a port of the server or a port of the client identified by the first request. In yet further embodiments, the second identifier is modified to include any identifier from the first request. Identifiers from the first request may identify any number of internet protocol addresses of clients 102 and servers 106, ports of the clients 102 and servers 106, TP or CP sessions, media streaming files or any client 102 or server 106 related resource or application.

Figure 6:
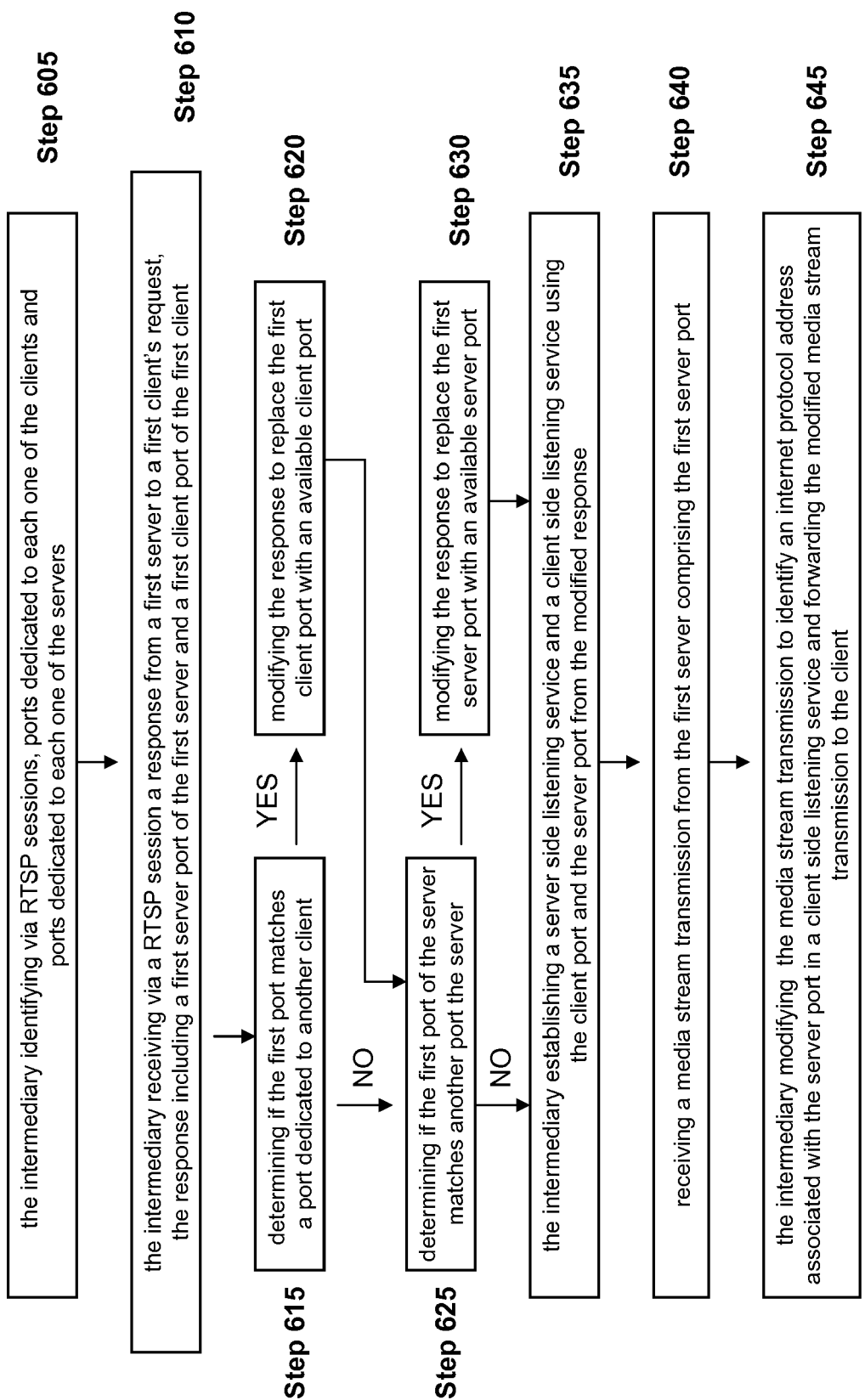
FIG. 6 is a flow diagram of an embodiment of steps of a method for load balancing and performing network address translation of transmissions communicated via RTSP sessions.

Referring now to FIG. 6, a method for managing by an intermediary a data session for media streaming between a client and a server and controlled by a Real Time Streaming Protocol (RTSP) session is depicted. In brief overview, at step 605 an intermediary identifies via RTSP sessions ports dedicated to each one of the clients and ports dedicated to each one of the servers. At step 610, the intermediary receives via RTSP session a response from a first server to a request from a first client, the response including a first server port of the first server and a first client port of the first client. At step 615, the intermediary determines if the first port matches a port dedicated to another client. At step 620, if the first port does match to a port dedicated to another client, the intermediary modifies the response to replace the first client port with an available client port. At step 625, if the first port does not match a port dedicated to another client, the intermediary determines if the first port matches another port of the server. At step 630, if the first port of the server does match another port of the server, the intermediary modifies the response to replace the first server port with an available server port. At step 635, the intermediary establishes a server side listening service and a client side listening service using the client port and the server port from the modified response. At step 640, the intermediary receives a media stream transmission from the first server comprising the first server port. At step 645, the intermediary modifies the media stream transmission to identify an internet protocol address associated with the server port in a client side listening service and forwards the modified media stream transmission to the client.

In further overview of FIG. 6, at step 605 an intermediary identifies via one or more RTSP sessions any number of ports dedicated to any number of clients and any number of ports dedicated to any number of servers. In some embodiments, the intermediary identifies via any CP session, such as a RTSP session, one or more ports of the clients on the appliance 200, wherein each port of the client is dedicated to a specific client 102 communicating with a server 106, via the appliance 200. In further embodiments, the intermediary identifies via a CP session one or more ports of a server 106 on the appliance 200, each port of the server 106 dedicated to transmission to a specific client 102. In further embodiments, the intermediary identifies via a CP session a plurality of ports of the plurality of servers 106, each port dedicated to TP session between a specific server 106 and a specific client 102. In some embodiments, the intermediary identifies client ports on the intermediary, each port dedicated to a specific client 102 with an established session to a specific server 106, via the appliance 200. In further embodiments, the intermediary identifies server ports and a specific server 106 with an established session having an active session with the appliance 200. Active sessions between the clients 102 and servers 106 may be any CP or TP sessions. In some embodiments, active sessions are any communication schemes or sessions via any protocol between the client 102 and server 106, via appliance 200.

At step 610, the intermediary receives via a CP session, such as a RTSP session, a response from a first server. In some embodiments, the response includes a first server port of the first server. In further embodiments, the response includes a first client port of the first client. In some embodiments, the response is a response to a request from a client 102 to establish a CP session, such as a RTSP session. The response from the first server may further include an internet protocol address of the client 102 the server 106 issued the response to. The response may further comprise an internet protocol address of the client 102 sending the request to the server 106. In some embodiments, the response from the first server includes an identifier uniquely identifying a CP session or a TP session between the client 102 and server 106. In further embodiments, the response from the first server includes an identifier uniquely identifying a resource or a service on the server 106 the client 102 is requesting to access or use.

At step 615, the intermediary 200 determines if a first port of the first client from the response matches any port dedicated to another client 102 or the same client. In some embodiments, the intermediary determines if the first port of the first client 102 matches any port of the first client 106 already dedicated to communications with another server 106. In some embodiments, the intermediary determines if the first port of the first client 102 matches any port already dedicated to communications between the intermediary 200 and another client 102. The intermediary 200 may use a policy, a function, a program or an algorithm to match the incoming first port of the client 102 against all ports of the clients 102 on the appliance 200 that are already used for communication with other servers 106. In some embodiments, CP/TP session manager 310 determines if the first port of the first client 102 matches a port of another client 102 already used for communication. If the intermediary 200 finds any matches, intermediary 200 may send an alert to the CP/TP session manager 310 that the first port may cause communication interference and that a preventive action needs to be taken.

At step 620, upon determining that the first port does match a port dedicated to another client, the intermediary modifies the response to replace the first client port with an available client port. In some embodiments, the CP/TP session manager 310 modifies the response. The intermediary 200 may modify the response by adding to the response a port of the client 102 not previously used for communication with another client 102 for the same server 106. The intermediary 200 may replace the first port with an available port. In some embodiments, the intermediary overwrites the first port with an available port. In further embodiments, the intermediary changes a portion of the first port to form an available port. Any part of the intermediary 200 may modify the response to include any unique identifier, such as the port of the first client, in order to avoid any communication conflicts of the transmissions between the server 106 and client 102. The intermediary 200 may modify the response to include any information that will enable transmission of the information between the client 102 and server 106 without any conflicts, interruptions or lost transmissions.

At step 625, the intermediary determines if the first port of the server matches another port of the server already used for communication. In some embodiments, the intermediary determines if the first port of the first server 106 matches any port of the first server 106 already dedicated to communications with another client 102. In some embodiments, the intermediary 200 determines if the first port of the first server 106 matches any port already dedicated to communications between the intermediary 200 and another server 106. The intermediary 200 may use a policy, a function, a program or an algorithm to match the incoming first port of the server 106 against all ports of the server 106 on the appliance 200 that are already used for communication of the server 106 with other clients 102. In some embodiments, CP/TP session manager 310 determines if the first port of the first server 106 matches a port the server 106 already used for communication with another client 102. If the intermediary 200 finds any matches, the intermediary 200 may send an alert to the CP/TP session manager 310 that the first port may cause communication interference and that a preventive action needs to be taken.

At step 630, if the first port of the server does match a port of the server already used for communication with another client 102, the intermediary modifies the response to replace the first server port with an available server port. In some embodiments, the CP/TP session manager 310 modifies the response. The intermediary 200 may modify the response by adding to the response a port of the server 106 not previously used for communication with another client 102. The intermediary 200 may replace the first port with an available port. In some embodiments, the intermediary overwrites the first port with an available port. In further embodiments, the intermediary changes a portion of the first port to form an available port. Any part of the intermediary 200 may modify the response to include any unique identifier, such as the port of the first client, in order to avoid any communication conflicts of the transmissions between the server 106 and client 102. The intermediary 200 may modify the response to include any information that will enable transmission of the information between the client 102 and server 106 without any conflicts, interruptions or lost transmissions.

At step 635, the intermediary establishes a server side listening service and a client side listening service using the client port and the server port from the modified response. In some embodiments, if the intermediary 200 determines that the first port of the client 102 does not match to another port of the client 102 at step 615, the intermediary establishes a server side listening service 300 using the first port of the client 102 from the response. In further embodiments, the intermediary 200 establishes a server side listening service 300 using the internet protocol address of the client 102. In some embodiments, if the intermediary 200 determines that the first port of the server 106 does not match to another port of the server 106 at step 625, the intermediary establishes a client side listening service 300 using the first port of the server 106 from the response. In further embodiments, the intermediary 200 establishes a client side listening service 300 using the internet protocol address of the server 106. In some embodiments, if the intermediary 200 determines that the first port of the client 102 does match to another port of the client 102 at step 615, the intermediary establishes a server side listening service 300 using the first port of the client 102 from the modified response. The intermediary 200 may establish a server side listening service 300 that includes the modified internet protocol address of the client 102. In some embodiments, if the intermediary 200 determines that the first port of the server 106 does match to another port of the server 106 at step 625, the intermediary establishes a client side listening service 300 using the first port of the server 106 from the modified response. In further embodiments, the intermediary 200 establishes a client side listening service 300 using the modified internet protocol address of the server 106.

At step 640, the intermediary receives a stream transmission from the first server comprising the first server port. In some embodiments, the intermediary receives a stream via a CP session, such as a RTSP session. The intermediary 200 may receive a media stream that includes a stream from a video or audio file or an online presentation comprising a plurality of media components. The stream received may include the most updated or modified first server port. The stream received may be directed to a client 102 via intermediary 200. The stream may utilize the first server port to identify the client 102 which is the final destination to receive the stream.

At step 645, the intermediary modifies the stream transmission to identify an internet protocol address associated with the first server port in a client side listening service and forwards the modified media stream transmission to the client. Sometimes, the intermediary forwards or sends the stream transmission to the destination, such as the client 102 without modifying the stream transmission. In some embodiments, the intermediary 200 modifies the stream transmission to include the internet protocol address of the client 102 associated with the first server port in a client side listening service. In some embodiments, the modified stream is the media stream comprising a stream of a media file such as a video, audio, online presentation, graphical file or similar type of media related file. In other embodiments, the intermediary modifies the media stream transmission to identify the information associated with the first server port. In cases where the first server port was matched to another server port at step 625, the intermediary 200 modifies the stream to identify an internet protocol address associated with the modified first port of the server. In some embodiments, the intermediary 200 modifies the stream to identify an internet protocol address associated with the first port of the modified response. In some embodiments, the internet protocol address comprises internet protocol addresses of a plurality of clients 102 receiving the stream. The intermediary 200 forwards the stream transmission to any intended destination identified by the internet protocol address associated with the first port of the server 106.

What is claimed is:

1. A method for managing a streaming session by an intermediary between a client and a server, the method comprising:
  a) receiving, by an intermediary between a client and a server, a response from the server to a request of the client to setup a media stream, the response comprising a first session identifier established by the server;
  b) identifying, by the intermediary, via the response the port and the internet protocol address of the server;
  c) encoding, by the intermediary, a port of the server and an internet protocol address of the server into the first session identifier to form a second session identifier;
  d) modifying, by the intermediary, the response to identify the second session identifier as the session identifier provided by the server; and
  e) transmitting, by the intermediary, the modified response to the client responsive to the request of the client to setup the media stream.

2. The method of claim 1, wherein step (c) further comprises prefixing, by the intermediary, a concatenation of the internet protocol address and the port of the server to the first session identifier.

3. The method of claim 1, wherein step (c) further comprises appending, by the intermediary, a concatenation of the port and the internet protocol address of the server to the first session identifier.

4. The method of claim 1, wherein step (d) further comprises replacing, by the intermediary, in the response the first session identifier with the second session identifier.

5. The method of claim 1, further comprising receiving, by the intermediary, a second request from the client to control the media stream, the second request identifying the second session identifier.

6. The method of claim 5, further comprising decoding, by the intermediary, the port and the internet protocol address from the second session identifier.

7. The method of claim 5, further comprising decoding, by the intermediary, the first session identifier of the server from the second session identifier of the second request.

8. The method of claim 5, further comprising modifying, by the intermediary, the second request to use the first session identifier and forwarding the modified request to the port and the internet protocol address of the server identified via the second session identifier.

9. The method of claim 1, further comprising receiving, by the intermediary, a second request from the client to control the media stream, the intermediary determining that a session identifier of the second request does not comprise identification of the port and the internet protocol address of the server, and in response to the determination, transmits a second response to the client indicating that the session identifier is one of not valid, not found or that a service requested by the second request is unavailable.

10. A system for managing a streaming session by an intermediary between a client and a server, the system comprising:

an intermediary device between a client and a server, configured to:
receive a response from the server to a request of the client to setup a media stream, the response comprising a first session identifier established by the server,
identify, via the response, the port and the internet protocol address of the server,
encode a port of the server and an internet protocol address of the server into the first session identifier to form a second session identifier,
modify the response to identify the second session identifier as the session identifier provided by the server, and
transmit the modified response to the client responsive to the request of the client to setup the media stream.

11. The system of claim 10, wherein the intermediary is further configured to prefix a concatenation of the internet protocol address and the port of the server to the first session identifier.

12. The system of claim 10, wherein the intermediary is further configured to append a concatenation of the port and the internet protocol address of the server to the first session identifier.

13. The system of claim 10, wherein the intermediary is further configured to replace in the response the first session identifier with the second session identifier.

14. The system of claim 10, wherein the intermediary is further configured to receive a second request from the client to control the media stream, the second request identifying the second session identifier.

15. The system of claim 14, wherein the intermediary is further configured to decode the port and the internet protocol address from the second session identifier.

16. The system of claim 14, wherein the intermediary is further configured to decode the first session identifier of the server from the second session identifier of the second request.

17. The system of claim 14, wherein the intermediary is further configured to modify the second request to use the first session identifier and forward the modified request to the port and the internet protocol address of the server identified via the second session identifier.

18. The system of claim 10, wherein the intermediary is further configured to:
receive a second request from the client to control the media stream,
determine that a session identifier of the second request does not comprise identification of the port and the internet protocol address of the server, and
in response to the determination, transmit a second response to the client indicating that the session identifier is one of not valid, not found or that a service requested by the second request is unavailable.

* * * * *